United States Patent
Kwon et al.

(10) Patent No.: US 7,702,047 B2
(45) Date of Patent: Apr. 20, 2010

(54) RF RECEIVING APPARATUS AND METHOD FOR REMOVING LEAKAGE COMPONENT OF RECEIVED SIGNAL

(75) Inventors: Ick Jin Kwon, Yongin-si (KR); Heung Bae Lee, Suwon-si (KR); Yun Seong Eo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 810 days.

(21) Appl. No.: 11/435,941

(22) Filed: May 18, 2006

(65) Prior Publication Data
US 2007/0116153 A1 May 24, 2007

(30) Foreign Application Priority Data
Nov. 22, 2005 (KR) .............. 10-2005-0111564

(51) Int. Cl.
*H04B 1/10* (2006.01)
*H04L 27/06* (2006.01)
*H04L 27/22* (2006.01)

(52) U.S. Cl. .............. 375/346; 375/331; 375/344; 375/345; 329/304

(58) Field of Classification Search .............. 375/144, 375/148, 254, 278, 283–285, 329–331, 344–346; 329/304, 318–320, 349, 350, 353; 455/501, 455/63.1, 67.13, 295, 296
See application file for complete search history.

(56) References Cited

U.S. PATENT DOCUMENTS

| | | | |
|---|---|---|---|
| 5,410,750 A * | 4/1995 | Cantwell et al. | ............ 455/306 |
| 5,444,864 A | 8/1995 | Smith | |
| 5,574,978 A | 11/1996 | Talwar et al. | |
| 6,169,912 B1 | 1/2001 | Zuckerman | |
| 6,516,185 B1 * | 2/2003 | MacNally | ................ 455/234.1 |

FOREIGN PATENT DOCUMENTS

| | | |
|---|---|---|
| DE | 10317600 A1 | 11/2004 |
| EP | 0364036 A2 | 4/1990 |
| JP | 07-074684 A | 3/1995 |
| WO | 2006037241 A1 | 4/2006 |

* cited by examiner

*Primary Examiner*—Young T. Tse
(74) *Attorney, Agent, or Firm*—Sughrue Mion, PLLC

(57) ABSTRACT

An RF receiving apparatus and method which can remove a leakage component in a received signal are provided. In the RF receiving apparatus, a noise removing unit estimates a signal corresponding to a noise component introduced into a received RF signal RXIN by controlling a gain and a phase of a local signal LOI and removes the estimated noise signal from the received RF signal RXIN. An RF signal in which the noise is removed is frequency-down converted in a receiving unit. Also, the noise removing unit utilizes a Q signal of the local signal LOI, LOQ, to control the phase of the local signal LOI.

21 Claims, 7 Drawing Sheets

RF RECEIVING APPARATUS AND METHOD FOR REMOVING LEAKAGE COMPONENT OF RECEIVED SIGNAL

CROSS-REFERENCE TO RELATED APPLICATION

This application claims priority from Korean Patent Application No. 10-2005-111564, filed on Nov. 22, 2005, in the Korean Intellectual Property Office, the entire disclosure of which is incorporated herein by reference.

BACKGROUND OF THE INVENTION

1. Field of the Invention

Apparatuses and methods consistent with the present invention relate to transmitting/receiving radio frequency (RF) signals, and more particularly, to reducing a direct current (DC) offset due to a phase noise and reducing a gain linearity by removing a leakage component in a received signal.

2. Description of Related Art

A transceiver transmitting/receiving an RF signal is utilized in a system for transmitting/receiving high speed wireless data, such as a mobile phone, a digital multimedia broadcasting (DMB) phone, and a personal digital assistant (PDA). A transmitter transmits data by including the data in a predetermined carrier signal. A receiver extracts data by processing a received RF signal. Presently, the development of a transceiver, which can be miniaturized with low power consumption even in a ubiquitous system of a multi-band orthogonal frequency division multiplexing ultra-wide band standard (MB-OFDM UWB), is an important issue in the design and implementation of various types of portable systems. FIG. 1 is a diagram illustrating a conventional RF receiver 100. Referring to FIG. 1, the RF receiver 100 includes an in-phase mixer (I-mixer) 110, a quadrature-phase mixer (Q-mixer) 130, low pass filters (LPFs) 120 and 140, and a demodulator 150.

The I-mixer 110 multiplies and frequency-down converts a received RF signal RXIN and a local signal LOI. In this instance, a signal obtained by the multiplication is processed in the LPF 120 and an output of the LPF 120 is input into the demodulator 150. The Q-mixer 130 multiplies and frequency-down converts the RF signal RXIN and a Q signal, LOQ, of the local signal LOI. In this instance, the signal obtained by the multiplication is processed in the LPF 140 and an output of the LPF 140 is input into the demodulator 150. The demodulator 150 demodulates the outputs of the LPFs 120 and 140 according to algorithms such as phase shift keying (PSK), quadrature phase shift keying (QPSK) and amplitude shift keying (ASK), and obtains certain information contained in the signal that is demodulated. The demodulated signal may be further processed in a post processor. Also, the demodulated signal may then be indicated as information that a user can recognize, via an audio output device or display, such as a mobile phone, a DMB phone, a PDA, and a radio frequency identification (RFID) reader.

The conventional RF receiver 100 may receive a noise component with the RF signal RXIN. The demodulator 150 has a complex task of removing effects, such as gain saturation, a DC offset, and phase variation of a received RF signal caused by a noise component. The aforementioned complex task of the demodulator 150 for improving a signal-to-noise ratio (SNR) of a received signal may increase a circuit complexity and power consumption. Also, the received noise component described above may be introduced from a directional coupler (DCPLR), which is utilized in a transceiver of a general full-duplex communication method. As an example, a transceiver of a system such as an RFID tag reader transmits/receives an RF signal via one antenna. In this case, leakage of an RF signal that is transmitted may be introduced into an RF signal that is received by a DCPLR that connects transmitting and receiving paths.

SUMMARY OF THE INVENTION

The present invention provides an RF receiver which can generate a signal that is identical to a noise component and removes a noise in a received RF signal to remove effects, such as gain saturation, a DC offset, and phase variation of the received RF signal caused by the noise component, and can demodulate a clean signal in which the noise is removed.

The present invention also provides an RF receiving method which can detect a noise component, such as a leakage of a transmitting signal, and remove and process the noise component in a received RF signal.

According to an aspect of the present invention, an RF receiver is provided including: a noise removing unit that estimates a noise signal introduced into a received signal from the received signal by controlling a gain and a phase of a local signal, and removing the noise signal that is estimated from the received signal; and a receiving unit that performs a frequency down conversion of the received signal in which the noise signal that is estimated is removed, using at least one of the local signal and a Q signal of the local signal, wherein the noise removing unit controls the phase of the local signal using the Q signal of the local signal.

According to another aspect of the present invention, the noise removing unit of the RF receiver may include: a phase correction unit that generates a phase controlled local signal and a phase controlled Q signal of the local signal in which the phases of the local signal and the Q signal of the local signal are controlled respectively by using a synthesis of the received signal and the Q signal of the local signal; an amplitude correction unit generating the estimated noise signal which is the phase controlled local signal in which a gain is controlled by comparing an amplitude of the received signal and an amplitude of the phase controlled local signal; and a subtracter removing the estimated noise signal of the amplitude correction unit, from the received signal.

The receiving unit of the RF receiver according to another aspect of the present invention includes a mixer synthesizing the received signal in which the estimated noise signal is removed, and the Q signal of the local signal. In this instance, the noise removing unit includes: a phase correction unit generating a phase controlled local signal in which the phase of the local signal is controlled, using an output of the mixer; an amplitude correction unit generating the estimated noise signal which is the phase controlled local signal in which the gain is controlled by comparing an amplitude of the received signal and an amplitude of the phase controlled local signal; and a subtracter removing the estimated noise signal of the amplitude correction unit, from the received signal.

The receiving unit of the RF receiver according to still another aspect of the present invention includes: a first mixer synthesizing the received signal, in which the estimated noise signal is removed, and the local signal; and a second mixer synthesizing the received signal, in which the estimated noise signal is removed, and the Q signal of the local signal. In this instance, the noise removing unit includes: a phase control unit generating the local signal in which the phase is controlled according to the synthesized output of the second mixer, the synthesized output of the second mixer being low pass filtered; a gain control unit generating the estimated noise signal which is the phase controlled local signal in which the amplitude is controlled according to the synthesized output of the first mixer, the synthesized output of the first mixer being low pass filtered; and a subtracter removing the estimated noise signal of the gain control unit, from the received signal.

According to another aspect of the present invention, there is provided an RF receiving method including: controlling a phase of a local signal by using a Q signal of the local signal; estimating a noise signal introduced into the received signal from the received signal, by controlling a gain of the phase controlled local signal; removing the estimated noise signal from the received signal; and frequency-down converting the received signal in which the estimated noise signal is removed, by using at least one of the local signal and the Q signal of the local signal.

BRIEF DESCRIPTION OF THE DRAWINGS

The above and other aspects of the present invention will become apparent and more readily appreciated from the following detailed description, taken in conjunction with the accompanying drawings of which.

DETAILED DESCRIPTION OF EXEMPLARY EMBODIMENTS

Figure 1:
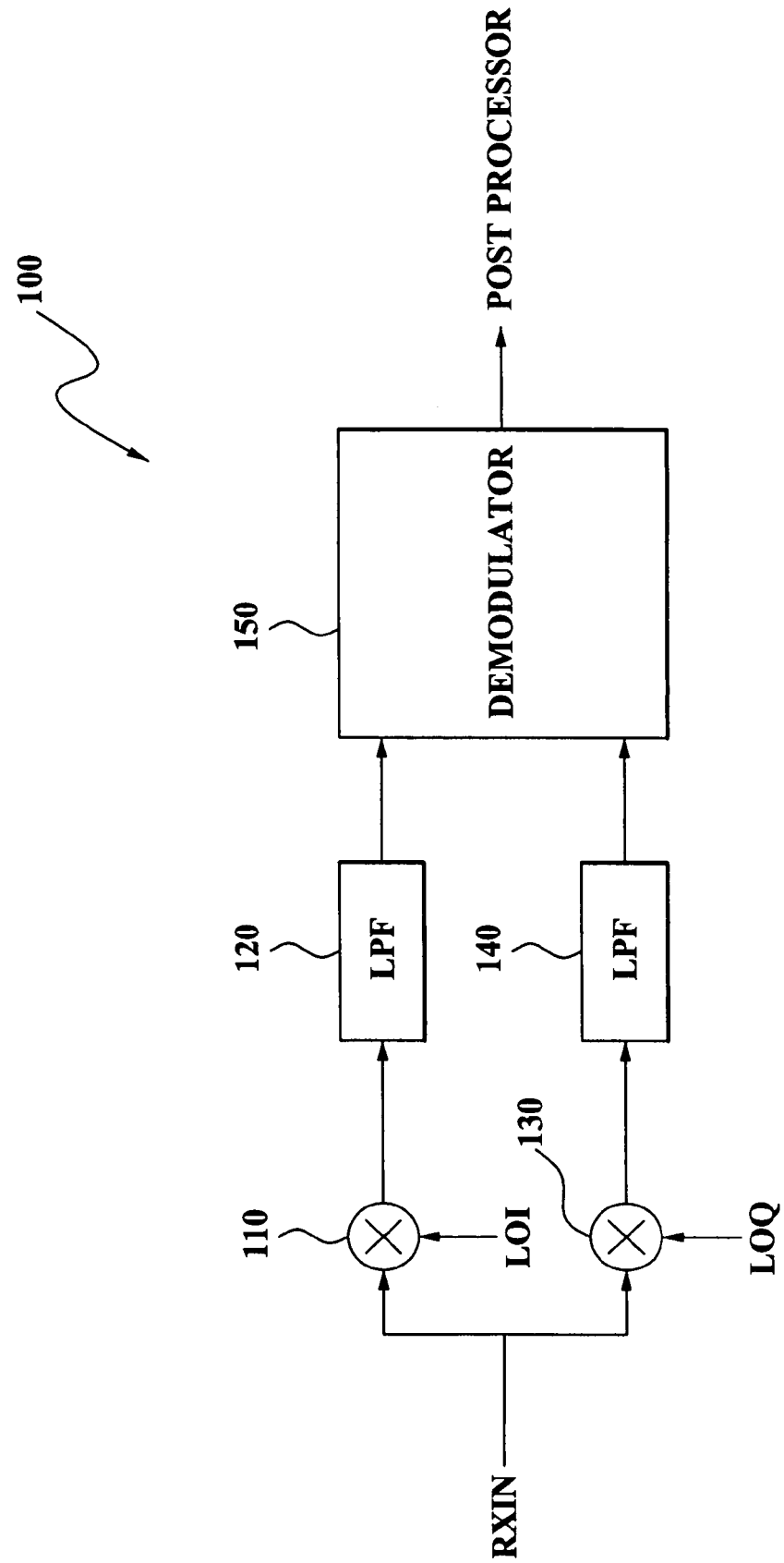
FIG. 1 is a diagram illustrating a conventional RF receiver.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
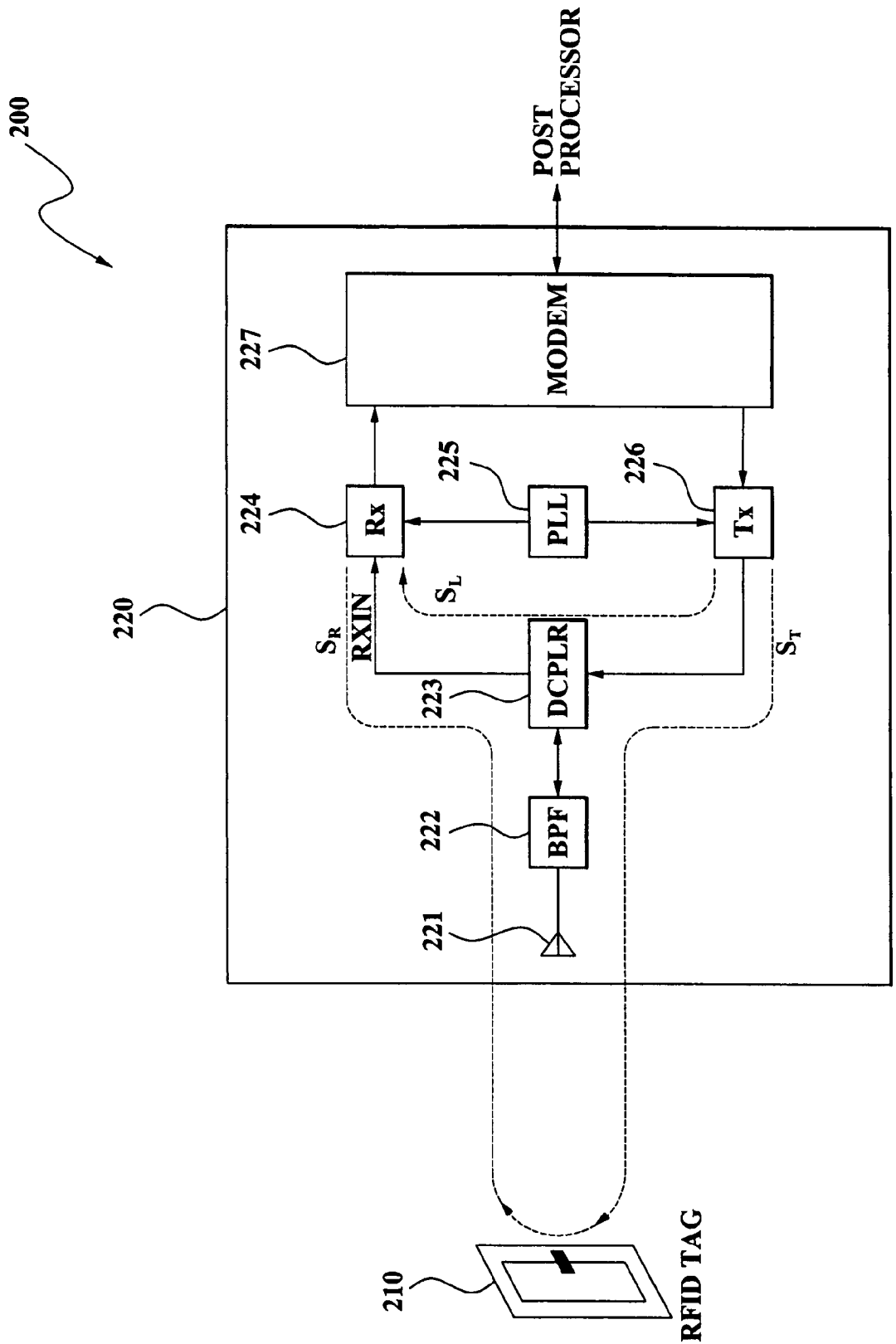
FIG. 2 is a diagram illustrating an RFID transmitting/receiving system.

FIG. 2 is a diagram for explaining an RFID transmitting/receiving system 200. Referring to FIG. 2, the RF transmitting/receiving system 200 includes an RFID tag 210 and a reader 220. The RFID tag 210 includes identification information in an RF signal from the reader 220. The RFID tag 210 may be attached to objects, such as goods, freights, materials and securities such as stocks, certificates, etc., and also to animals and plants. The RFID tag 210 stores identification information associated with a corresponding article in an integrated circuit (IC) chip. The reader 220 reads and manages the identification information associated with the corresponding article, which is stored in the IC chip, by a non-contact method. Through this, the reader 220 makes efficient management possible with respect to production, distribution, and sales. As described above, an RFID tag reader has been taken as an example of an RF transceiver, but the principles described herein are applicable to all systems that transmit or receive RF signals.

A signal is processed in a modulation/demodulation unit (MODEM) 227. The reader 220 transmits the processed signal to the RFID tag 210 via a transmitting unit Tx 226, a DCPLR 223, a band pass filter (BPF) 222 and an antenna 221. An RF signal which is reflected while carrying information read from the RFID tag 210 is received in a receiving unit Rx 224 via the antenna 221, the BPF 222 and the DCPLR 223. A signal that is converted to baseband in the receiving unit 224 may be demodulated in the MODEM 227. Also, the demodulated signal may be processed and managed in a post processor. A phase locked loop (PLL) 225 is utilized for locking a phase of a carrier wave signal and a local signal. In this instance, the carrier wave signal is utilized to transmit the information contained in the demodulated signal in the MODEM 227 in the form of an RF signal and the local signal is used in the frequency down conversion of a received RF signal. The carrier wave signal and the local signal for transmitting/receiving may have the same frequency $f_0$ in the reader 220.

To easily remove a noise signal component introduced into a received RF signal RXIN, as in the conventional RF receiver, the receiving unit 224 utilizes a local signal LOI and a Q signal, LOQ, of the local signal LOI for frequency-down conversion. The noise may be externally introduced into the received RF signal RXIN from external environments. However, according to an aspect of the present invention, an output of the transmitting unit 226 may be used to remove a leakage that is introduced via the DCPLR 223 when used in a transceiver that employs of a full-duplex communication method such as the reader 220. As shown in a graph 710 of FIG. 7, when spectrum $S_T$ of an output of the transmitting unit 226 has a certain size in carrier wave frequency $f_0$, leakage signal spectrum $S_L$ introduced via the DCPLR 223 may have a certain size as shown in a graph 720. In this instance, as shown in a graph 730, an $S_L$ component 732, in addition to a clean $S_R$ spectrum component 731 of a received RF signal within $\pm\Delta$, is introduced into a spectrum of a signal received in the receiving unit 224.

The RF signal RXIN received in the receiving unit 224 may be represented as Equation 1. In Equation 1, $A_{RF}\cos(\omega_{RF}t)$ corresponds to the $S_R$ component 731, and $A_{leak}\cos(\omega_{LO}t)$ corresponds to the $S_L$ component 732.

$$V_{RXIN}(t) = A_{RF}\cos(\omega_{RF}t) + A_{leak}\cos(\omega_{LO}t) \quad \text{(Equation 1)}$$

When a received RF signal RXIN is processed in a frequency-down converting mixer to convert the received RF signal RXIN in the receiving unit 224 to a baseband, phase variation, a DC offset and gain saturation are generated by the $S_L$ component 732. In this case, a circuit of a post demodulator becomes complicated to remove the effects as described above. Also, the DC offset deteriorates an SNR of the received signal. Accordingly, the DC offset needs to be removed.

As an example, assuming that a local signal, LOI, and a Q signal, LOQ, of the local signal LOI as shown in Equation 2 below, are used in a mixer for frequency-down converting the received RF signal RXIN, a frequency-down converted signal may be represented as Equation 3. In Equation 2, $\theta$ represents a phase difference between the $S_L$ component 732 and one of the local signal LOI or the Q signal, LOQ, of the local signal LOI.

$$V_{LOI}(t) = A_{LO}\cos(\omega_{LO}t + \theta)$$

$$V_{LOQ}(t) = A_{LO}\sin(\omega_{LO}t + \theta) \quad \text{(Equation 2)}$$

$$V_{IFI}(t)=\{A_{RF}\cos(\omega_{RF}t)+A_{leak}\cos(\omega_{LO}t)\}A_{LO}\cos(\omega_{LO}t+\theta)$$

$$V_{IFQ}(t)=\{A_{RF}\cos(\omega_{RF}t)+A_{leak}\cos(\omega_{LO}t)\}A_{LO}\sin(\omega_{LO}t+\theta) \quad \text{(Equation 3)}$$

Accordingly, when Equation 3 is utilized, it can be determined that a DC offset component, in addition to a frequency-down converted component, exists as shown in Equation 4 below.

DC component of $V_{IFI}(t)=\frac{1}{2}A_{leak}A_{LO}\cos\theta$

DC component of $V_{IFQ}(t)=\frac{1}{2}A_{leak}A_{LO}\sin\theta$ (Equation 4)

In an exemplary embodiment of the present invention, the received noise component as described above, i.e., the $S_L$ component 732, is estimated upstream of the receiving unit 224 and removed from the received RF signal RXIN. Accordingly, a clean received signal may be generated and processed in the subsequent receiving unit 224 and the MODEM 227. Also, in the case of demodulation in the MODEM 227, a load for removing the DC offset may be reduced.

As an example, when $A_{leak}\cos(\omega_{LO}t)$ which corresponds to the $S_L$ component 732 is estimated in Equation 1, a clean received signal component, i.e., $A_{RF}\cos(\omega_{RF}t)$ which corresponds to the $S_R$ component 731, may be obtained by removing $A_{leak}\cos(\omega_{LO}t)$ from the received RF signal RXIN.

Figure 3:
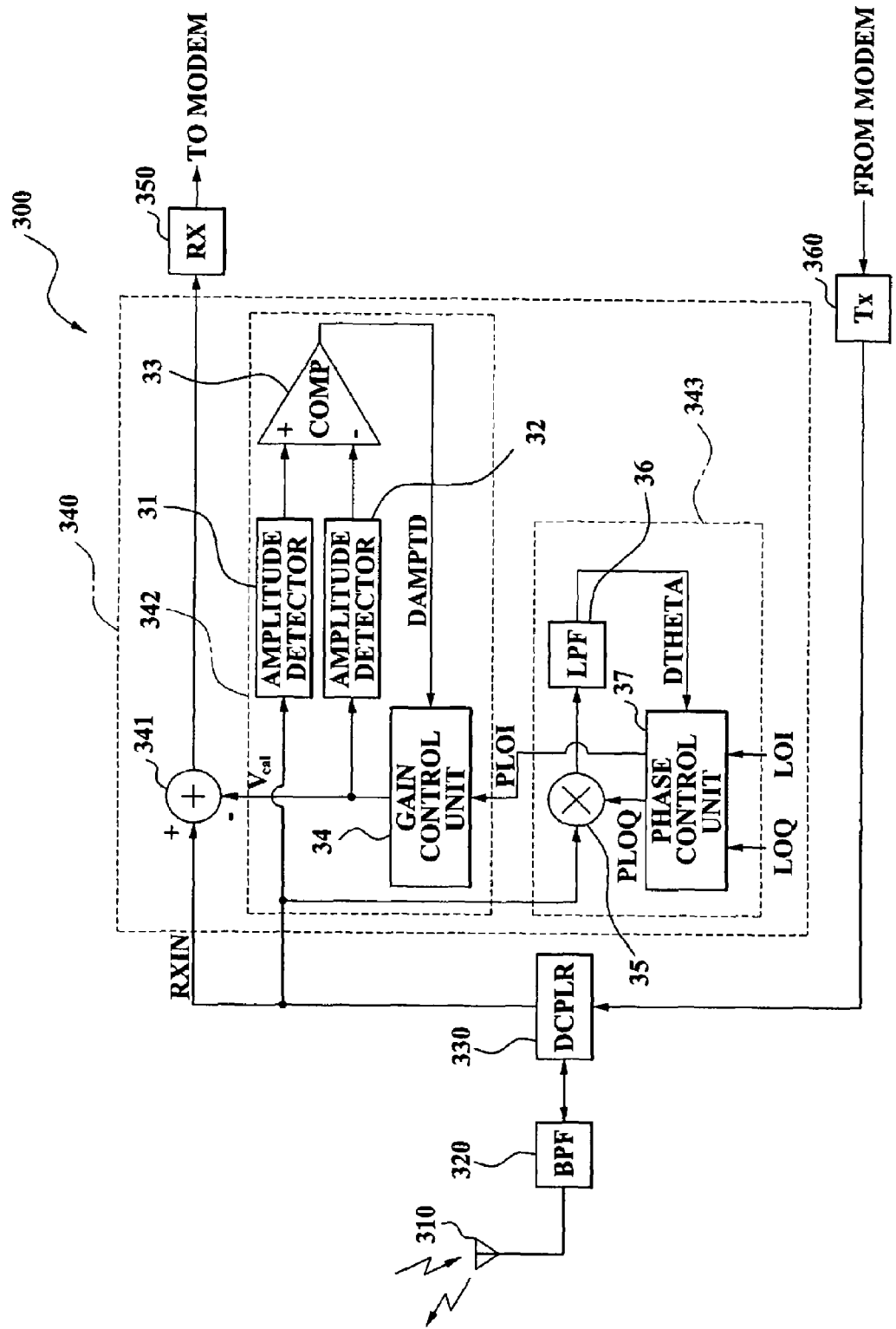
FIG. 3 is a diagram illustrating an RF transceiver according to an exemplary embodiment of the present invention.

For this, an RF transceiver 300 according to an exemplary embodiment of the present invention is illustrated in FIG. 3. Referring to FIG. 3, the RF transceiver 300 includes an antenna 310, a BPF 320, a DCPLR 330 and a transmitting unit 360. This is similar to FIG. 2. Also, the RF transceiver 300 includes a noise removing unit 340 and a receiving unit 350.

The noise removing unit 340 estimates a noise signal introduced into a received RF signal RXIN from the received RF signal RXIN, by controlling a gain and a phase of a local signal LOI. Also, the noise removing unit 340 removes the estimated noise signal $V_{cal}$ in the received RF signal RXIN. Accordingly, the receiving unit 350 frequency-down converts the received RF signal RXIN in which the estimated noise signal $V_{cal}$ has been removed from the received RF signal RXIN, using at least one of the local signal LOI and a Q signal, LOQ, of the local signal LOI. The noise removing unit 340 controls the phase of the local signal LOI using the Q signal, LOQ, of the local signal LOI.

In this instance, the local signal LOI and the Q signal thereof may be generated in a certain PLL of the transceiver 300. Also, the Q signal is a signal that has a 90 degree phase difference relative to the local signal LOI as shown in Equation 2.

Also, the noise removing unit 340 includes a subtracter 341, an amplitude correction unit 342 and a phase correction unit 343.

The phase correction unit 343 generates signals PLOI and PLOQ in which the phases of the local signal LOI and the Q signal, LOQ, of the local signal LOI are controlled by using a synthesis of the received RF signal RXIN and the Q signal, LOQ, of the local signal LOI. The amplitude correction unit 342 generates the estimated noise signal $V_{cal}$ which is a signal in which a gain of the phase controlled local signal PLOI is controlled by comparing an amplitude of the received RF signal RXIN and an amplitude of the phase controlled local signal PLOI.

The estimated noise signal $V_{cal}$ generated in the amplitude correction unit 342 may be represented as Equation 5. In Equation 5, when phase $\theta$ is controlled to be zero and $A_{cal}$ is controlled to be the same as $A_{leak}$, the estimated noise signal $V_{cal}$ becomes identical to the $S_L$ component 732 of Equation 1.

$$V_{cal}=A_{cal}\cos(\omega_{LO}t+\theta) \quad \text{(Equation 5)}$$

The estimated noise signal $V_{cal}$ is removed from the received RF signal RXIN via the subtracter 341. The received signal in which noise has been removed is outputted from the subtracter 341 and transmitted to the receiving unit 350. A substantial operation of the subtracter 341 may be performed by adding the received RF signal RXIN and a 180 degree phase converted signal of the estimated noise signal $V_{cal}$.

In FIG. 3, the phase correction unit 343 includes a mixer 35, an LPF 36 and a phase control unit 37.

The mixer 35 synthesizes the received RF signal RXIN into which an $S_R$ component and an $S_L$ component are introduced, as shown in Equation 1, and the phase controlled Q signal PLOQ, of the local signal LOI, in the phase control unit 37. The $S_L$ component, as described above, is a leakage signal component into which a portion of an $S_T$ component is introduced via the DCPLR 330. The synthesis of the mixer 35 is to generate and output a signal that is obtained by multiplying the received RF signal RXIN and the phase controlled local signal PLOQ, as the multiplication in $V_{IFQ}(t)$ of Equation 3.

The LPF 36 low pass filters the synthesized output of the mixer 35. The phase control unit 37 controls the phases of the local signal LOI and the Q signal, LOQ, of the local signal LOI according to a DC level DTHETA which is outputted from the LPF 36. As an example, the phase control unit 37 increases or decreases the phases of the local signal LOI and the Q signal, LOQ, thereof according to the DC level DTHETA which is outputted from the LPF 36, and controls phase $\theta$ to be zero in Equation 5.

The received RF signal RXIN and the local signals LOI and LOQ may be a set of differential signals. The mixer 35 may output a set of synthesized differential signals. As is already known, a set of differential signals is a set of two signals having a 180 degree phase difference from each other and generally utilized to improve SNR of a signal.

In FIG. 3, the amplitude correction unit 342 includes a first amplitude detector 31, a second amplitude detector 32, a comparator 33, and a gain control unit 34.

The first amplitude detector 31 detects an amplitude of the received RF signal RXIN. The second amplitude detector 32 detects an amplitude of the signal in which the gain of the phase controlled local signal PLOI is controlled in the gain control unit 34.

Accordingly, the comparator 33 compares outputs of the first and the second amplitude detectors 31 and 32 and outputs a signal DAMPTD corresponding to the output difference therebetween. As an example, the comparator 33 may output a digital value according to the results of comparison.

The gain control unit 34 generates the estimated noise signal $V_{cal}$ which is the signal in which the gain of the phase controlled local signal PLOI is controlled according to the output DAMPTD of the comparator 33. As an example, the gain control unit 34 increases or decreases the amplitude of the phase controlled local signal PLOI according to a digital value outputted from the comparator 33 and controls amplitude $A_{cal}$ to be identical to $A_{leak}$ in Equation 5. In this manner, the gain control unit 34 generates the estimated noise signal $V_{cal}$.

The estimated noise signal $V_{cal}$ in the noise removing unit 340 is subtracted from the received RF signal RXIN via the subtracter 341. The received signal in which noise has been removed is outputted from the subtracter 341 and transmitted to the receiving unit 350.

Figure 4:
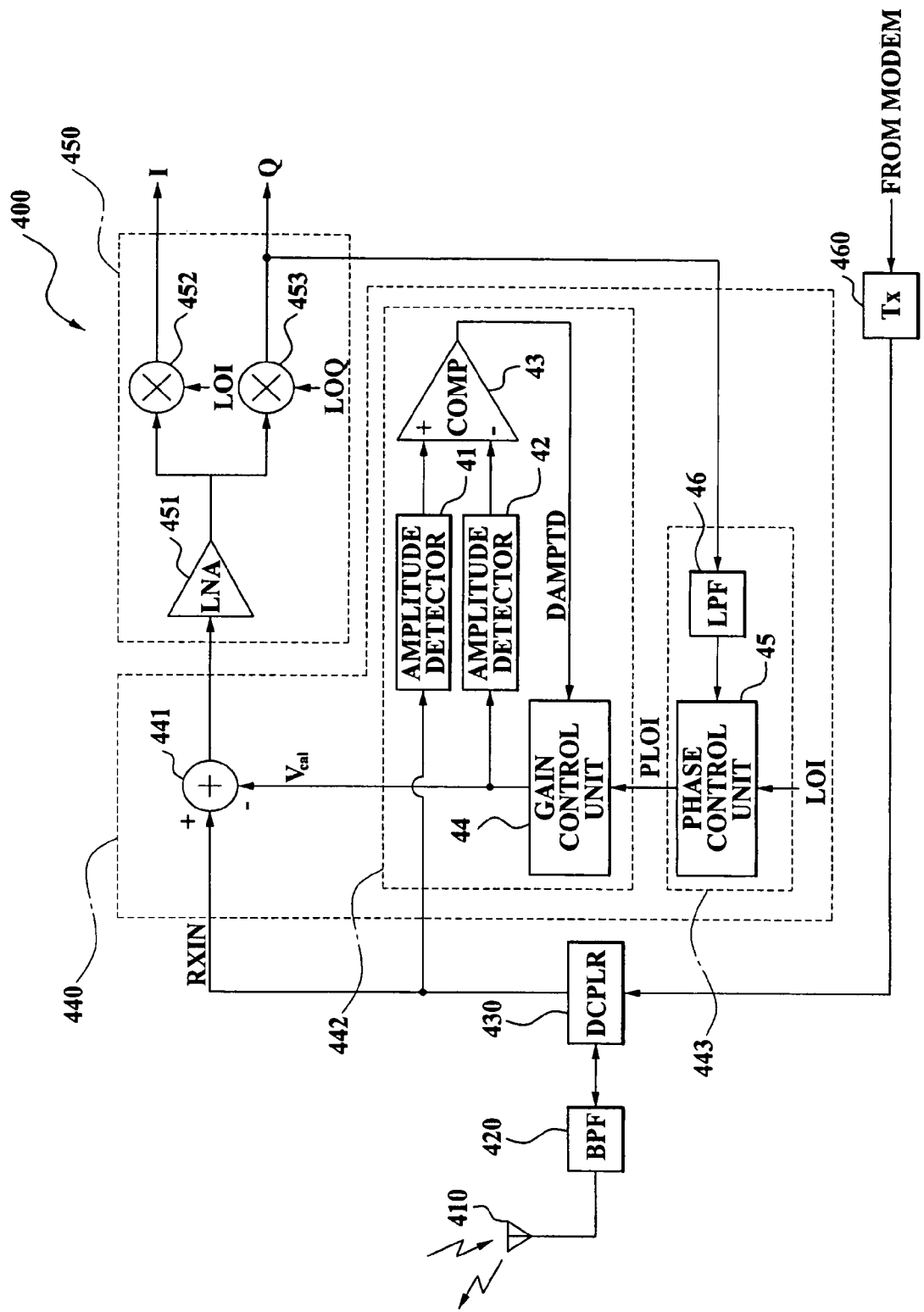
FIG. 4 is a diagram illustrating an RF transceiver according to another exemplary embodiment of the present invention.

An RF transceiver 400 according to another exemplary embodiment of the present invention is illustrated in FIG. 4. Referring to FIG. 4, the RF transceiver 400 includes an antenna 410, a BPF 420, a DCPLR 430 and a transmitting unit 460. Also, the RF transceiver 400 includes a noise removing unit 440 and a receiving unit 450.

The receiving unit 450 includes a first mixer 452 and a second mixer 453 for frequency-down conversion. Also, the receiving unit 450 may further optionally include a low noise amplifier (LNA) 451 for reducing a noise. The first mixer 452 synthesizes the local signal LOI and a received signal in which an estimated noise signal $V_{cal}$ has been removed via the noise removing unit 440, or the local signal LOI and a signal in which the noise removed signal is amplified in the amplifier 451. Also, the second mixer 453 synthesizes a Q signal, LOQ, of the local signal LOI and the received signal in which the estimated noise signal $V_{cal}$ has been removed via the noise removing unit 440, or the LOQ and a signal which the noise removed signal is amplified in the amplifier 451. Another exemplary embodiment of the present invention discloses that the first mixer 452 may not be utilized when an input of the receiving unit 450 is a signal in which a leakage component, i.e., $A_{leak} \cos(\omega_{LO} t)$ which corresponds to the $S_L$ component 732 in Equation 1 is removed.

In FIG. 4, a signal in a Q-path generated in the receiving unit 450, i.e., an output of the second mixer 453, is utilized in the noise removing unit 440. Namely, the noise removing unit 440 includes a subtracter 441, an amplitude correction unit 442 and a phase correction unit 443. An output of the second mixer 453 is utilized in the phase correction unit 443. This embodiment simplifies a circuit by removing the mixer 35 utilized in FIG. 3.

The phase correction unit 443 includes a phase control unit 45 and an LPF 46. The LPF, 46 low pass filters the output of the second mixer 453. The phase control unit 45 increases or decreases a phase of the local signal LOI according to a DC output of the LPF 46 and controls phase θ to be zero in Equation 5.

Accordingly, the amplitude correction unit 442 receives a phase controlled local signal PLOI from the phase correction unit 443. Also, the amplitude correction unit 442 compares an amplitude of a received RF signal RXIN and an amplitude of the phase controlled local signal PLOI and increases or decreases a gain of the phase controlled local signal PLOI and controls amplitude $A_{cal}$ to be identical to $A_{leak}$ in Equation 5. In this manner, the amplitude correction unit 442 generates the estimated noise signal $V_{cal}$.

The amplitude correction unit 442 includes a first amplitude detector 41, a second amplitude detector 42, a comparator 43 and a gain control unit 44. An operation of the amplitude correction unit 442 is similar to the amplitude correction unit 342 of FIG. 3. Accordingly, description related thereto will be omitted herein.

Figure 5:
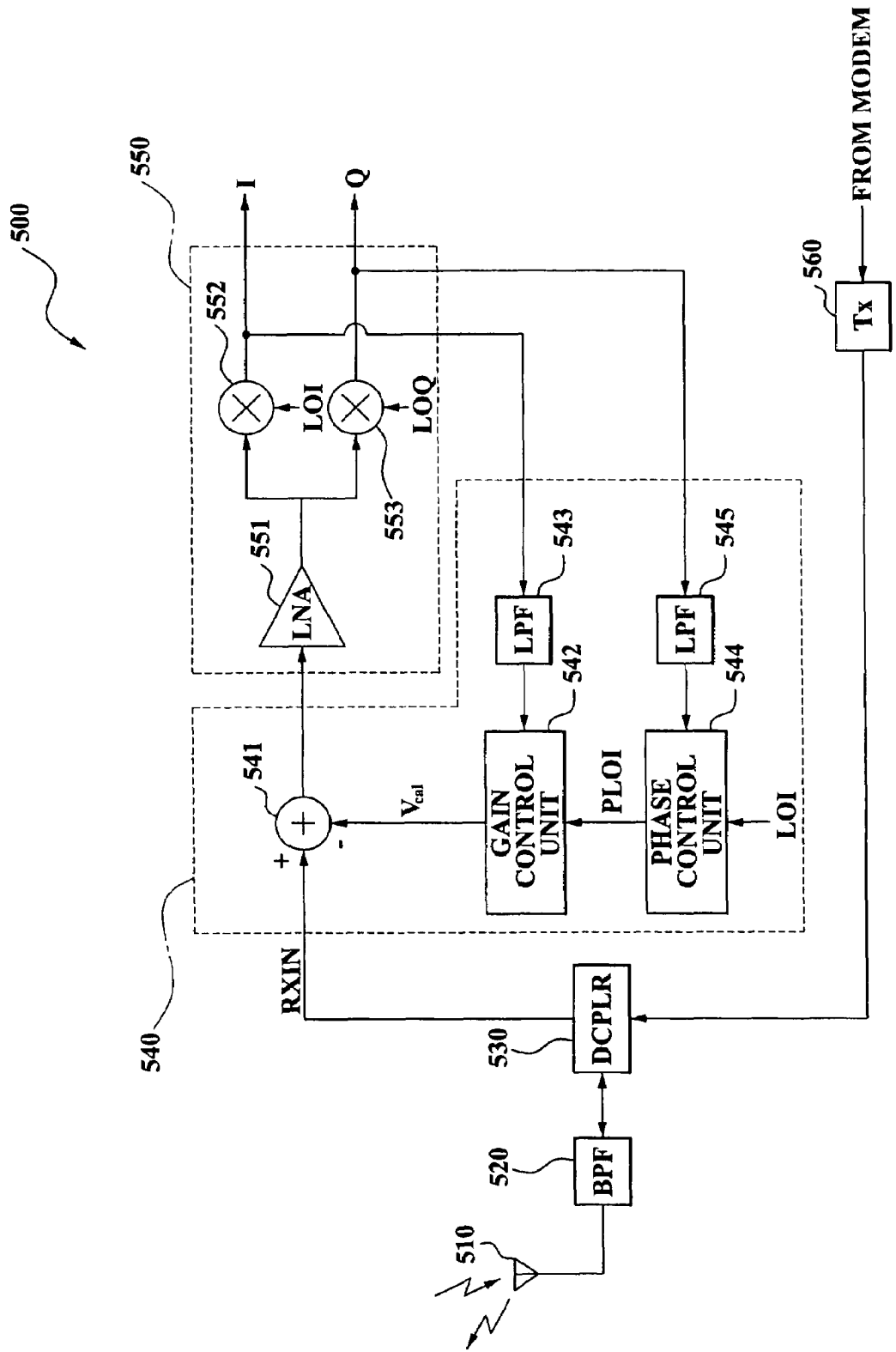
FIG. 5 is a diagram illustrating an RF transceiver according to still another exemplary embodiment of the present invention.

An RF transceiver 500 according to still another exemplary embodiment of the present invention is illustrated in FIG. 5. Referring to FIG. 5, the RF transceiver 500 includes an antenna 510, a BPF 520, a DCPLR 530 and a transmitting unit 560. This is similar to FIG. 4. Also, the RF transceiver 500 includes a noise removing unit 540 and a receiving unit 550.

The receiving unit 550 includes a first mixer 552 and a second mixer 553 for frequency-down conversion. Also, the receiving unit 550 may further optionally include an LNA 551 for reducing a noise. The first mixer 552 synthesizes the local signal LOI and a received signal in which an estimated noise signal $V_{cal}$ has been removed via the noise removing unit 540, or synthesizes the local signal LOI and a signal which the noise removed signal is amplified in the amplifier 551. Also, the second mixer 553 synthesizes a Q signal, LOQ, of the local signal LOI and the received signal in which the estimated noise signal $V_{cal}$ has been removed via the noise removing unit 540, or the LOQ and a signal which the noise removed signal is amplified in the amplifier 551.

In FIG. 5, signals in I and Q-paths generated in the receiving unit 550, i.e., outputs of the first mixer 552 and the second mixer 553, are utilized in the noise removing unit 540. This is to simplify a circuit by removing the first and the second amplitude detectors 41 and 42, and the comparator 43 which are utilized in FIG. 4.

The noise removing unit 540 includes a subtracter 541, a gain control unit 542, and a phase control unit 544, a first LPF 543 and a second LPF 545.

The phase control unit 544 generates a signal, PLOI, and controls phase θ to be zero in Equation 5. PLOI is the local signal LOI in which phase θ is controlled according to a synthesized output of the second mixer 553 which is low pass filtered in the second LPF 545.

The gain control unit 542 generates the estimated noise signal $V_{cal}$. The estimated noise signal $V_{cal}$ is the local signal PLOI in which the amplitude of the phase controlled local signal PLOI is controlled according to a synthesized output of the first mixer 552 which is low pass filtered in the first LPF 543.

The estimated noise signal $V_{cal}$ is subtracted from the received RF signal RXIN via the subtracter 541. The signal in which noise has been removed is outputted from the subtracter 541 and transmitted to the receiving unit 550.

Frequency-down conversion of a received signal from the subtracter 541 according to a synthesis of the mixers 552 and 553 may be performed by multiplying two signals, as shown in Equation 3. As an example, when the received RF signal RXIN is 3000 MHz and the local signal is 1000 MHz, a signal of 2000 MHz may be generated by multiplying the two signals. In this case, a generated signal in a frequency higher than 3000 MHz may be filtered as noise. When a frequency-down converted signal, as shown above in which a DC component has been removed in the mixers 552 and 553, is a signal within an intermediate frequency band, the frequency-down converted signal may be initially converted once more to a baseband by other mixers and subsequently processed in a subsequent LPF.

Figure 6:
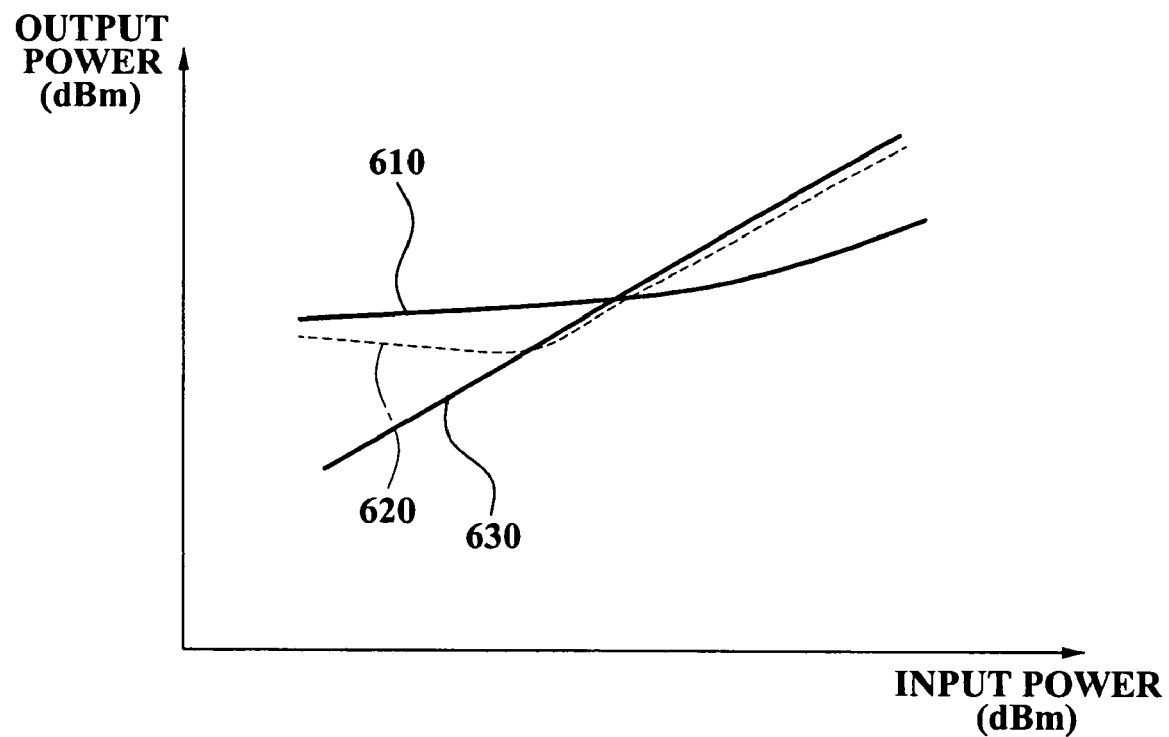
FIG. 6 is a diagram for explaining a function of a receiving unit according to exemplary embodiments of the present invention.
Figure 7:
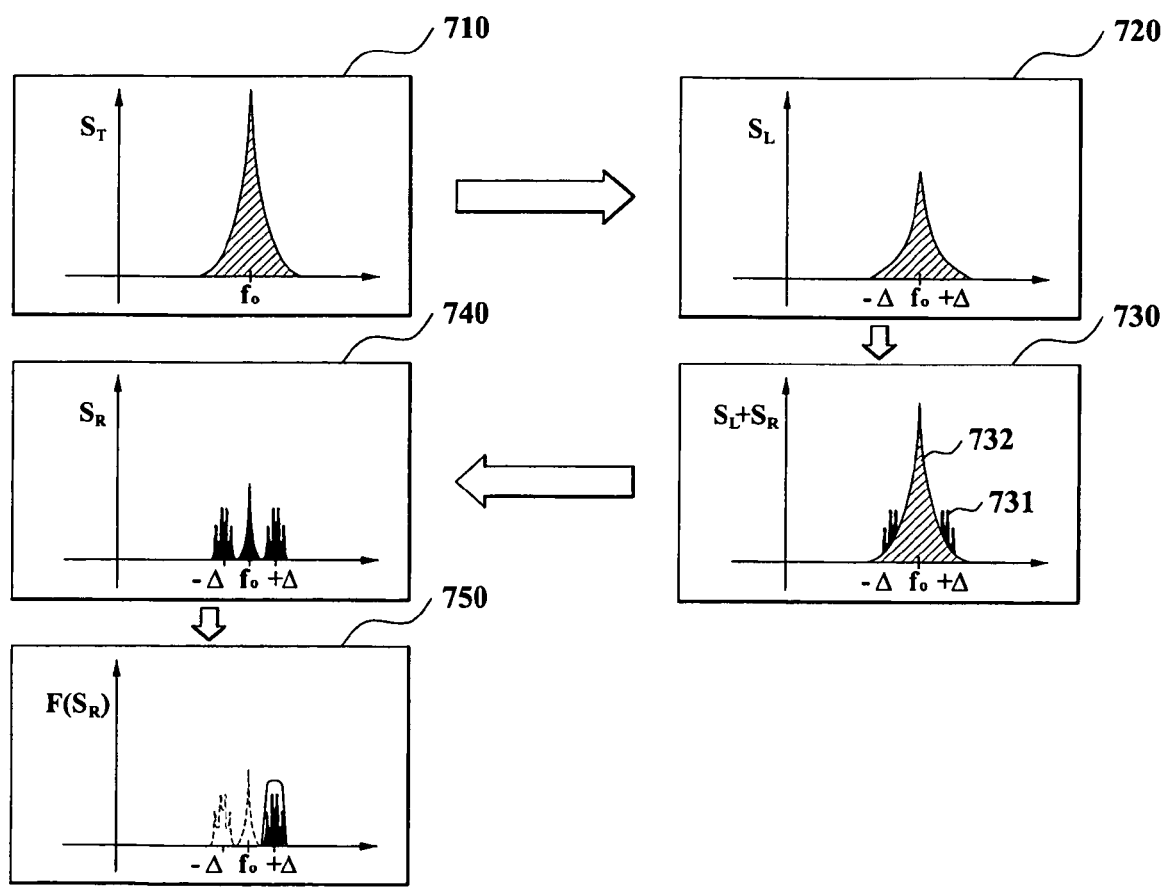
FIG. 7 is a diagram illustrating frequency spectrums for explaining a process of processing a transmitted/received signal by an RF transceiver according to exemplary embodiments of the present invention.

As described above, when a phase and an amplitude of the estimated noise signal $V_{cal}$ of Equation 5 which may be estimated by using the noise removing unit 540 are identical to $A_{leak} \cos(\omega_{LO} t)$ which corresponds to the $S_L$ component 732, outputs of the mixers 552 and 553 may show only clean identification information by only an $S_R$ component 740, as shown in FIG. 7. This is because a phase variation or DC offset shown in a signal synthesized by $A_{leak} \cos(\omega_{LO} t)$ which corresponds to the $S_L$ component 732 is removed and linearity of a gain is improved while the gain is not being saturated, as shown in graphs 620 and 630 of FIG. 6. In FIG. 6, the noise removing unit 340, 440 or 540 according to the above-described exemplary embodiments of the present invention is not applied to a curve 610. Accordingly, the curve 610 shows that SNR decreases and linearity of a gain is deteriorated because of a DC offset. The line 620 is a curve when $A_{leak} \cos(\omega_{LO} t)$ which corresponds to the $S_L$ component 732 affects more than in the curve 630.

When only clean identification information read from the RFID tag 210 is outputted from the mixers 552 and 553, and processed in the LPF in FIG. 2, information contained in ±Δ as shown in a graph 750 of FIG. 7 may be demodulated in a stable manner. As the $S_L$ component 732 is removed in a noise removing unit, such as 340, 440 or 540 described above, the MODEM 227 may perform demodulation with a minimal burden to remove a noise effect, such as a DC offset.

As described above, in an RF receiver according to an exemplary embodiment of the present invention, the noise removing unit 340, 440 or 540 controls a gain and a phase of a local signal LOI, estimates a signal $V_{cal}$ which corresponds to a noise component introduced into a received RF signal RXIN, and removes the estimated noise signal $V_{cal}$ from the received RF signal RXIN. In this manner, a clean RF signal in which noise has been removed is frequency-down converted in the receiving unit 350, 450 or 550. The noise removing unit 340, 440 or 540 utilizes a Q signal, LOQ, of the local signal LOI and controls a phase of the local signal LOI.

The RF receiver and RF receiving method according to aspects of the present invention, as described above, generates a signal which is similar to a noise component and removes the noise component in a received RF signal, to process a clean signal in which noise has been removed. Accordingly, when performing demodulation for removing a phase variation, a DC offset and gain saturation of a received RF signal is removed as a noise component and a burden for the demodulation may be reduced. Also, a circuit area is reduced and its complexity is decreased. Further, power consumption may also be reduced. Accordingly, the RF receiver and receiving method according to aspects of the present invention may be utilized in a transceiver of a ubiquitous system such as a mobile phone, a DBM phone, and a PDA, for transmitting/receiving high speed wireless data and also may increase system performance.

Exemplary embodiments of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although a few exemplary embodiments of the present invention have been shown and described, the present invention is not limited to the exemplary embodiments described herein. Instead, it will be appreciated by those skilled in the art that changes may be made to these exemplary embodiments without departing from the principles and spirit of the invention, the scope of which is defined by the claims and their equivalents.

What is claimed is:

1. A radio frequency (RF) receiver comprising:
    a noise removing unit which estimates a noise signal that is introduced into a received signal by controlling a phase of a local signal and a gain of the local signal, and removes the noise signal that is estimated, from the received signal; and
    a receiving unit which performs a frequency-down conversion of the received signal in which the noise signal that is estimated, is removed, using at least one of the local signal and a quadrature (Q) signal of the local signal,
    wherein the noise removing unit controls the phase of the local signal using the Q signal of the local signal.

2. The RF receiver of claim 1, wherein the noise removing unit comprises:
    a phase correction unit which generates a phase controlled local signal and a phase controlled Q signal of the local signal in which the phase of the local signal and a phase of the Q signal of the local signal are controlled respectively by using a synthesis of the received signal and the Q signal of the local signal;
    an amplitude correction unit which generates the estimated noise signal which is the phase controlled local signal in which the gain is controlled by comparing an amplitude of the received signal and an amplitude of the phase controlled local signal; and
    a subtracter which removes the estimated noise signal of the amplitude correction unit, from the received signal.

3. The RF receiver of claim 2, wherein the phase correction unit comprises:
    a mixer which synthesizes the received signal and the phase controlled Q signal of the local signal;
    a low pass filter connected to an output of the mixer; and
    a phase control unit which controls the phases of the local signal and the Q signal of the local signal, according to an output of the low pass filter.

4. The RF receiver of claim 3, wherein the phase control unit increases or decreases the phases of the local signal and the Q signal of the local signal, according to a direct current (DC) value outputted from the low pass filter.

5. The RF receiver of claim 3, wherein the mixer generates and outputs a signal that is obtained by multiplying the received signal and the phase controlled Q signal of the local signal.

6. The RF receiver of claim 5, wherein the received signal and the phase controlled Q signal of the local signal are a set of differential signals, and the mixer outputs a set of synthesized differential signals.

7. The RF receiver of claim 2, wherein the amplitude correction unit comprises:
    a first amplitude detector which detects the amplitude of the received signal;
    a second amplitude detector which detects the amplitude of the phase controlled local signal in which the gain is controlled;
    a comparator which outputs a signal corresponding to an output difference between the first and the second amplitude detectors; and
    a gain control unit which generates the estimated noise signal which is the phase controlled local signal in which the gain is controlled according to an output of the comparator.

8. The RF receiver of claim 7, wherein the gain control unit increases or decreases the amplitude of the phase controlled local signal according to a digital value outputted from the comparator.

9. The RF receiver of claim 1, wherein the receiving unit includes a mixer which synthesizes the received signal in which the estimated noise signal has been removed, and the Q signal of the local signal.

10. The RF receiver of claim 9, wherein the noise removing unit comprises:
    a phase correction unit which generates a signal in which the phase of the local signal is controlled, using an output of the mixer;
    an amplitude correction unit which generates the estimated noise signal which is a signal in which a gain of a phase controlled local signal is controlled by comparing an amplitude of the received signal and an amplitude of the phase controlled local signal; and
    a subtracter which removes the estimated noise signal of the amplitude correction unit, from the received signal.

11. The RF receiver of claim 10, wherein the phase control unit comprises:
- a low pass filter connected to the output of the mixer; and
- a phase control unit which controls the phase of the local signal according to an output of the low pass filter.

12. The RF receiver of claim 1, wherein the receiving unit comprises:
- a first mixer which synthesizes the received signal in which the estimated noise signal has been removed, and the local signal; and
- a second mixer which synthesizes the received signal in which the estimated noise signal has been removed, and the Q signal of the local signal.

13. The RF receiver of claim 12, wherein the noise removing unit comprises:
- a phase control unit which generates a phase controlled local signal in which the phase is controlled according to a synthesized output of the second mixer which is low pass filtered;
- a gain control unit which generates the estimated noise signal which is the phase controlled local signal in which the amplitude is controlled according to a synthesized output of the first mixer, the synthesized output of the first mixer being low pass filtered; and
- a subtracter which removes the estimated noise signal of the gain control unit, from the received signal.

14. A transceiver comprising the RF receiver of claim 1, wherein a noise of a transmitting signal is introduced into the received signal from a directional coupler which transmits/receives an RF signal.

15. A radio frequency (RF) receiving method comprising:
- controlling a phase of a local signal by using a quadrature (Q) signal of the local signal;
- estimating a noise signal introduced into a received signal by controlling a gain of a phase controlled local signal;
- removing the estimated noise signal from the received signal; and
- frequency-down converting the received signal in which the estimated noise signal has been removed, by using at least one of the local signal and the Q signal of the local signal.

16. The method of claim 15, wherein:
- the phase controlled local signal and a phase controlled Q signal of the local signal in which phases of the local signal and the Q signal of the local signal are controlled respectively, are generated using a synthesis of the received signal and the Q signal of the local signal; and
- the estimated noise signal which is the phase controlled local signal in which a gain is controlled, is generated by comparing an amplitude of the received signal and an amplitude of the phase controlled local signal.

17. The method of claim 15, wherein the frequency-down converting comprises:
- synthesizing the received signal in which the estimated noise signal has been removed and the Q signal of the local signal to generate a synthesized signal.

18. The method of claim 17, wherein:
- the phase controlled local signal in which the phase of the local signal is controlled, is generated by using the synthesized signal; and
- the estimated noise signal which is the phase controlled local signal in which a gain is controlled, is generated by comparing an amplitude of the received signal and an amplitude of the phase controlled local signal.

19. The method of claim 15, wherein the frequency-down converting the received signal comprises:
- first synthesizing the received signal in which the estimated noise signal has been removed, and the local signal; and
- subsequently synthesizing the received signal in which the estimated noise signal has been removed, and the Q signal of the local signal.

20. The method of claim 19, further comprising:
- generating the phase controlled local signal in which the phase is controlled according to the subsequent synthesized signal which is low pass filtered, wherein the estimated noise signal which is the phase controlled local signal in which an amplitude is controlled, is generated according to the first synthesized signal, and the first synthesized signal being low pass filtered.

21. A computer readable recording medium, excluding carrier waves, storing computer readable codes for causing a computer to execute a radio frequency (RF) receiving method comprising:
- controlling a phase of a local signal by using a quadrature (Q) signal of the local signal;
- estimating a noise signal introduced into a received signal by controlling a gain of a phase controlled local signal;
- removing the estimated noise signal from the received signal; and
- frequency-down converting the received signal in which the estimated noise signal has been removed, by using at least one of the local signal and the Q signal of the local signal.

* * * * *